United States Patent [19]
Wakefield

[11] Patent Number: 5,717,314
[45] Date of Patent: Feb. 10, 1998

[54] APPARATUS AND METHOD OF MONITORING BATTERY TEMPERATURE DURING CHARGING

[75] Inventor: Ivan Nelson Wakefield, Cary, N.C.

[73] Assignee: Ericsson Inc., Research Triangle Park, N.C.

[21] Appl. No.: 712,787

[22] Filed: Sep. 12, 1996

[51] Int. Cl.$^6$ .............................. H01M 10/44; H02J 7/00
[52] U.S. Cl. ............................................................ 320/35
[58] Field of Search ............................ 320/35; 324/431, 324/441

[56] References Cited

U.S. PATENT DOCUMENTS

| | | | |
|---|---|---|---|
| 2,555,630 | 6/1951 | Bishner | 171/97 |
| 3,414,796 | 12/1968 | Henquet | 320/14 |
| 3,767,995 | 10/1973 | Kaminski et al. | 320/22 |
| 3,898,547 | 8/1975 | Poole | 320/2 |
| 4,673,861 | 6/1987 | Dubovsky et al. | 320/2 |
| 4,684,870 | 8/1987 | George et al. | 320/20 |
| 4,727,306 | 2/1988 | Misak et al. | 320/35 |
| 4,994,726 | 2/1991 | Tamura et al. | 320/2 |
| 5,150,031 | 9/1992 | James et al. | 320/2 |
| 5,185,565 | 2/1993 | Uchida | 320/39 |
| 5,220,268 | 6/1993 | Rose et al. | 320/2 |
| 5,229,703 | 7/1993 | Harris | 320/2 |
| 5,291,118 | 3/1994 | Kojima | 320/35 |
| 5,317,249 | 5/1994 | Ford | 320/2 |
| 5,332,957 | 7/1994 | Lee | 320/2 |
| 5,351,283 | 9/1994 | Kunitomo | 379/58 |
| 5,411,816 | 5/1995 | Patino | 429/7 |
| 5,504,416 | 4/1996 | Holloway et al. | 320/31 |
| 5,582,928 | 12/1996 | Farley | 429/7 |
| 5,608,304 | 3/1997 | Okumura | 320/5 |

*Primary Examiner*—Adolf Berhane
*Assistant Examiner*—Patrick B. Law

[57] ABSTRACT

An apparatus and method for charging a battery having a positive terminal, a negative terminal, and a third terminal is disclosed, where a thermistor is positioned across the negative terminal and the third terminal. The apparatus includes a positive contact positioned so as to engage the positive terminal of the battery, a negative contact positioned so as to engage the negative terminal of the battery, a third contact positioned so as to engage the third terminal of the battery, and a logic circuit connected to the positive, negative and third terminals. In addition, a switching device is provided which receives an input from the logic circuit that dictates whether the switching device is positioned closed so as to connect the third contact to a biasing source. The position of the switching device is determined by comparing the voltage at the third contact to a predetermined threshold voltage.

30 Claims, 3 Drawing Sheets

APPARATUS AND METHOD OF MONITORING BATTERY TEMPERATURE DURING CHARGING

BACKGROUND OF THE INVENTION

1. Field of the Invention

The present invention relates generally to the charging of batteries and, in particular, to an apparatus and method for monitoring the temperature of a battery during charging which may also be utilized to provide power to a portable communication device.

2. Description of Related Art

The use of rechargeable batteries to power electronic devices is well known and desirable in order to minimize cost and maximize use of resources. Such batteries have been utilized extensively with handheld mobile telephones and other portable communication equipment, among other items. It is generally desirable to charge the batteries as quickly as possible to minimize the amount of downtime therefor, so state of the art chargers normally will include a rapid charging circuit. This type of charging can be accomplished when the battery is detached from the communication device or the communication device is maintained in a non-operational (or "off") state. However, it has been found that the convenience in charging such a battery, as well as the ability to continue monitoring of incoming messages by the communication device during the charging process, is also desired by the user thereof. Accordingly, certain battery chargers have a second circuit incorporated therein which supplies charging current to the battery at a much slower rate to permit standby operation of the portable communication device.

Another factor important to the charging of a battery is its temperature, as certain types of rechargeable batteries (e.g., lithium and nickel-cadmium) have a tendency to gas or even explode when excess temperatures are reached due to overcharging. The battery temperature also has a bearing on whether the handheld mobile telephone or other portable communication device should be charged or powered. Therefore, it is desirable for the battery temperature to be monitored not only by the charger, but also by the portable communication device when it is in an operational state.

Several chargers exist for providing charge to batteries which are contemporaneously utilized to power a communication device (e.g., U.S. Pat. No. 5,317,249 to Ford, U.S. Pat. No. 5,150,031 to James et al., U.S. Pat. No. 4,727,306 to Misak et al., and U.S. Pat. No. 3,767,995 to Kaminski et al.). While these chargers appear to be useful for their intended purpose, they either interface directly with the communication device or are complicated by a number of circuits and/or components, thereby increasing the cost for both the charger and the associated battery.

In light of the foregoing, a primary objective of the present invention is to provide an apparatus and method which permits simultaneous monitoring of battery temperature by a charger and a portable communication device during charging of a battery which may be utilized to provide power to the portable communication device.

Another object of the present invention is to provide an apparatus and method of charging a battery which includes a protocol for biasing a thermistor in the battery so that the battery temperature can be separately monitored by a charger and a portable communication device which may be powered by such battery.

A further object of the present invention is to provide an apparatus and method of charging a battery which eliminates any conflict between a charger and a portable communication device which may be powered by such battery in being able to read the battery temperature.

Yet another object of the present invention is to provide an apparatus and method for charging a battery which determines whether a portable communication device is connected to such battery and is in an operational state.

These objects and other features of the present invention will become more readily apparent upon reference to the following description when taken in conjunction with the following drawing.

SUMMARY OF THE INVENTION

In accordance with a first aspect of the present invention, a method of charging a battery having a positive terminal, a negative terminal, and a third terminal, wherein a thermistor is positioned across the negative terminal and the third terminal, is disclosed as including the steps of determining whether a battery is connected to a battery charger for charging, determining whether the battery is also connected to a portable communication device in an operational state, biasing the thermistor so that a voltage is provided at the third battery terminal representative of a temperature in the battery, determining whether the battery temperature is within a designated temperature range, and charging the battery with a charge current so long as the battery temperature is within the designated temperature range. The thermistor is biased by a current from the portable communication device when the portable communication device is in an operational state; otherwise, the thermistor is biased by a current from the charger.

In accordance with a second aspect of the present invention, an apparatus for charging a battery having a positive terminal, a negative terminal, and a third terminal is disclosed, wherein a thermistor is positioned across the negative terminal and the third terminal to provide a voltage to the third battery terminal representative of a temperature in the battery. The charging apparatus includes a positive contact positioned so as to engage the positive terminal of a battery, a negative contact positioned so as to engage the negative terminal of the battery, a third contact positioned so as to engage the third terminal of the battery, a logic circuit connected to the positive, negative and third contacts, and a switching device receiving an input from the logic circuit which dictates whether the switching device is positioned closed so as to connect a biasing source to the third contact or positioned open, wherein the position of the switching device is determined by the voltage received from the third battery terminal. The switching device of the charging apparatus is maintained in the open position by the logic circuit when the battery is also connected to a portable communication device in an operational state and otherwise is maintained in the closed position by the logic circuit.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
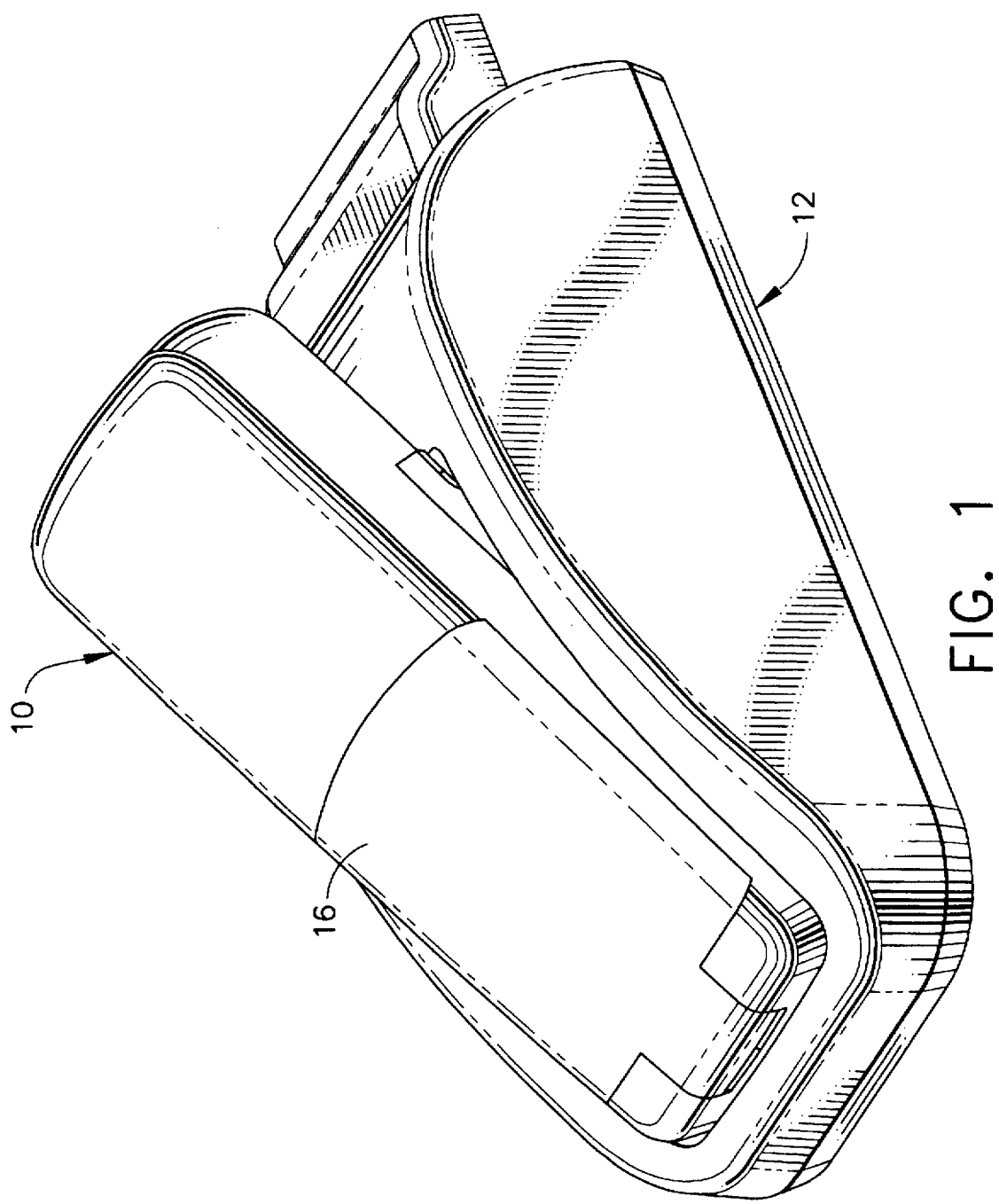
FIG. 1 is a diagrammatic view of a handheld mobile telephone positioned received by a battery charger, where a battery pack utilized to power the handheld mobile telephone is able to be charged in accordance with the present invention.
Figure 2A:
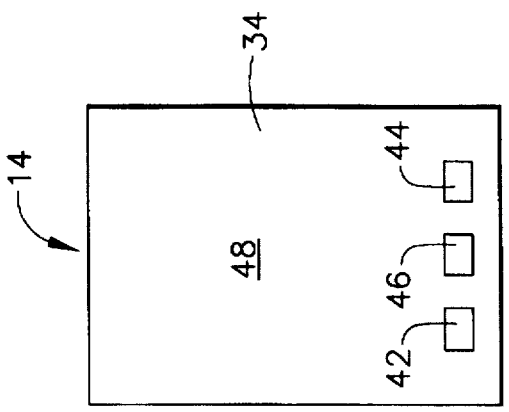
FIG. 2A is a diagrammatic rear view of a battery pack used to provide power to the handheld mobile telephone of FIG. 1 which may also be charged by the battery charger shown in FIG. 1.

Referring now to the drawing in detail, wherein identical numerals indicate the same elements throughout the figures, FIG. 1 depicts a handheld mobile telephone 10 received by a battery charger 12 so that a battery pack 14 (shown in FIGS. 2A and 2B) can be charged while also being available to supply power to handheld mobile telephone in accordance with the present invention. Handheld mobile telephone 10 includes a main housing 16 which contains signal processing circuitry (not shown) therein for operating it in a designated mode of communication.

It will be understood that battery pack 14 is of compatible shape and size so as to be positioned within a cavity in a rear surface (not shown) of main housing 16. More specifically, it will be seen from FIG. 3 that battery pack 14 includes a plurality of cells 15 having a positive terminal 18 and a negative terminal 20. A third terminal 22 is connected to negative terminal 20 via a thermistor 24 in order to provide a voltage indicative of the temperature for battery pack 14, as discussed further herein.

Figure 2B:
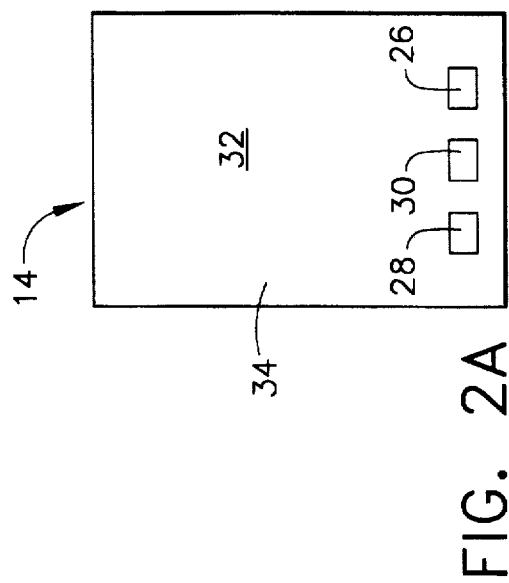
FIG. 2B is a diagrammatic front view of the battery pack depicted in FIG. 2A.

A first set of contacts 26, 28, and 30 are located on a surface 32 of a housing 34 for battery pack 14 (see FIG. 2A) and positioned so as to interface with corresponding contacts 36, 38, and 40 of handheld mobile telephone 10. A second set of contacts 42, 44, and 46 are located on a surface 48 (preferably located opposite surface 32, as seen in FIG. 2B) of battery pack housing 34 and positioned so as to interface with corresponding contacts 50, 52, and 54 of battery charger 12. It will be seen that contacts 26 and 42 of battery pack 14 are connected to positive terminal 18, contacts 28 and 44 are connected to negative terminal 20, and contacts 30 and 46 are connected to third terminal 22. Accordingly, contacts 36 and 38 of handheld mobile telephone 10 are connected to positive contact 26 and negative contact 28, respectively, while contact 40 is connected to third contact 30 when battery pack 14 is properly positioned within main housing 16 of handheld mobile telephone 10. Similarly, contacts 50 and 52 of battery charger 12 are connected to positive contact 42 and negative contact 44, respectively, while third contact 54 is connected to third contact 46 when battery pack 14 is properly positioned with respect to battery charger 12. It will be noted that negative contacts 38 and 52 of handheld mobile telephone 10 and battery charger 12, respectively, are also connected to ground. A resettable fuse 55 is preferably located between positive terminal 18 and positive contacts 26 and 42 of battery pack 14 in order to limit the amount of current from entering battery cells 15, thereby protecting against shorting of battery pack 14.

Figure 3:
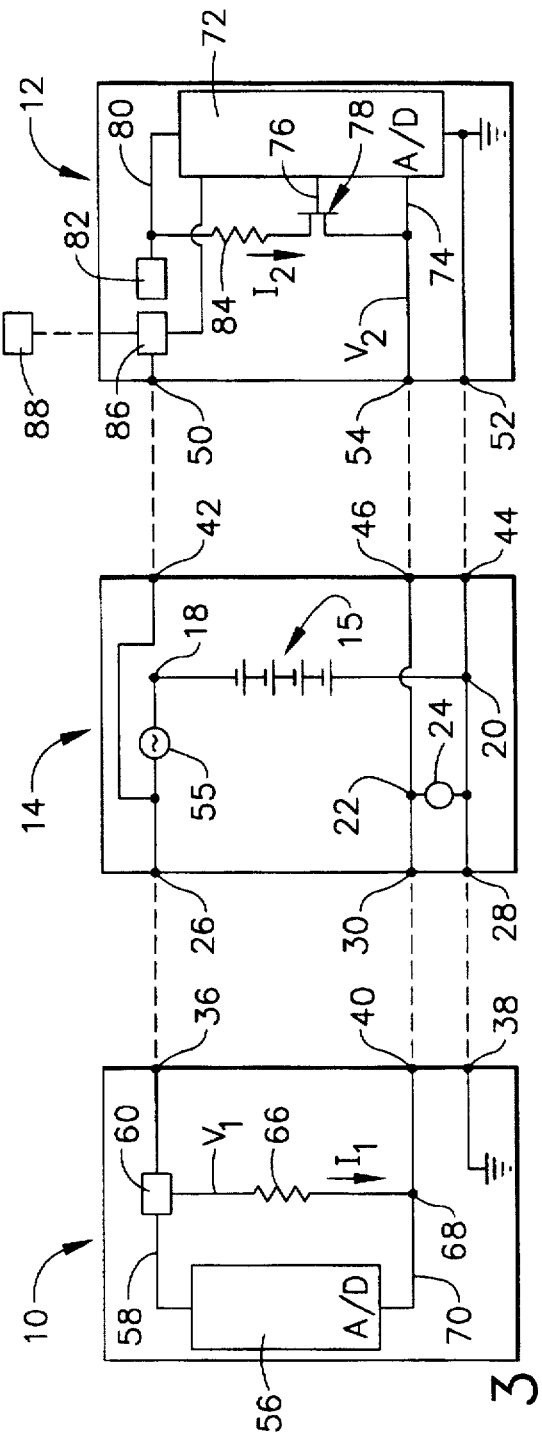
FIG. 3 is a schematic diagram of the handheld mobile telephone and the battery charger depicted in FIG. 1, along with the battery pack depicted in FIGS. 2A and 2B.

As seen in FIG. 3, handheld mobile telephone 10 includes a logic circuit 56 having an output 58 for on/off control of handheld mobile telephone 10, output 58 being connected to a voltage regulator 60 which is, in turn, connected to positive contact 36 of handheld mobile telephone 10. A biasing resistor 66 is positioned between voltage regulator 60 and a node 68, node 68 being connected to third contact 40 of handheld mobile telephone 10. It will be understood that a regulated voltage $V_1$ is provided by voltage regulator 60 to biasing resistor 66 only when output 58 thereof is set to place handheld mobile telephone 10 in an operational or "on" state. Thus, no voltage is provided to biasing resistor 66 when handheld mobile telephone 10 is in a nonoperational or "off" state. In this way, a current $I_1$ is provided to bias thermistor 24 from third contact 40 of handheld mobile telephone 10 through third contact 30 of battery pack 14. It will also be seen that logic circuit 56 has an input 70 connected to node 68, where an analog-to-digital converter in logic circuit 56 is able to read the voltage provided from battery pack 14 and convert it into a temperature therefor. Logic circuit 56 is then able to monitor the temperature of battery pack 14 during charging and determine whether handheld mobile telephone 10 should be charged and/or powered.

Battery charger 12 likewise includes a logic circuit 72 which has an input 74 connected to third contact 54 of battery charger 12. Input 74 is receptive of a voltage $V_2$ from third contact 46 of battery pack 14 indicative of the voltage across thermistor 24 within battery pack 14. Voltage $V_2$ is then compared to a threshold voltage $V_t$ so that logic circuit 72 is able to determine whether battery pack 14 is connected to handheld mobile telephone 10 and whether handheld mobile telephone 10 is in an operational state. It will be seen that logic circuit 72 of battery charger 12 has a first output 76 which is connected to a switching device 78, such as a transistor. First output 76 causes switching device 78 to be placed in a "closed" position when voltage $V_2$ is less than threshold voltage $V_t$ and otherwise maintains switching device 78 in an "open" position. The position of switching device 78 is relevant in light of a second output 80 from logic circuit 72, which is utilized to activate a voltage regulator 82 to provide a regulated voltage to a biasing resistor 84 connected to switching device 78. Provided switching device 78 is closed, a current $I_2$ is used (or enabled) to bias thermistor 24 in battery pack 14; otherwise, current $I_1$ from handheld mobile telephone 10 is utilized to bias thermistor 24 (and current $I_2$ is disabled from biasing thermistor 24).

It will be understood that voltage $V_2$ will be substantially zero when handheld mobile telephone 10 is not operational (or not present) since no voltage $V_1$ is provided from voltage regulator 60 and voltage $V_2$ will also be connected to ground. Thus, voltage $V_2$ will be less than threshold voltage $V_t$ (typically on the order of 25–50 millivolts), which signifies to logic circuit 72 that it should place switching device 78 in a closed position. Otherwise, voltage $V_2$ will remain greater than threshold voltage $V_t$ when voltage $V_1$ is provided and battery pack 14 is cool in temperature, as thermistor 24 is preferably a negative coefficient thermistor when biased as shown herein. In the case where voltage $V_1$ is provided and battery pack 14 is hot in temperature, voltage $V_2$ will maintain a minimum voltage greater than threshold voltage $V_t$ in order to signify to logic circuit 72 that switching device 78 remain open.

It will be noted that positive contact 50 of battery charger 12 is connected to a charge switch 86, which is in turn connected to logic circuit 72. Charge switch 86 is also connected to an AC power source 88, such as a common wall outlet. Accordingly, logic circuit 72 is able to control the charge current provided to battery pack 14 through positive contact 50, where one factor is the battery temperature read from battery pack 14. In fact, logic circuit 72 determines whether the battery temperature read from third contacts 46 and 54 of battery pack 14 and battery charger 12, respectively, is within a designated temperature range (preferably 0°–45° C.). Provided the battery temperature remains within the designated temperature range, then logic circuit 72 needs only to determine whether charging of battery pack 14 is completed (by reference to certain known characteristics as absolute temperature, negative delta V, increasing temperature slope, absolute voltage, etc.) or if the charging process must be continued.

Figure 4:
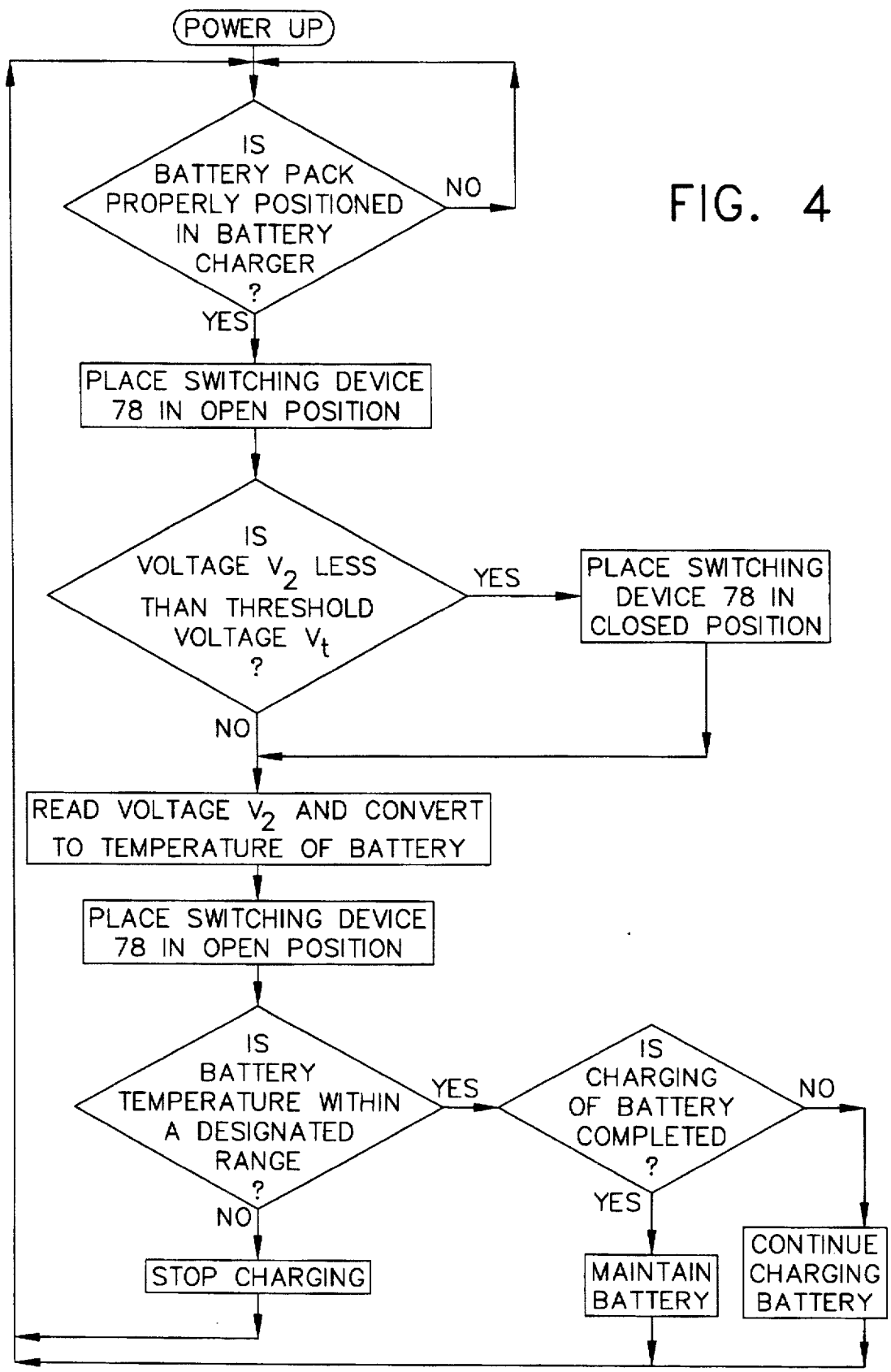
FIG. 4 is a flow diagram illustrating the steps taken by the battery charger of FIGS. 1 and 3 during the charging process to monitor the temperature of the battery pack.

Therefore, with respect to handheld mobile telephone 10, battery charger 12, and battery pack 14, it will be seen from the flow diagram illustrated in FIG. 4 that a process for charging battery pack 14 is described. As seen therein, once battery charger 14 is powered up, logic circuit 72 first determines whether a battery pack 14 is properly positioned therewith for charging by taking a reading across positive contact 50 and negative contact 52 thereof. If a battery pack 14 is properly positioned for charging, logic circuit 72 then places switching device 78 in an open position so that handheld mobile telephone 10 will bias thermistor 24 if it is in an operational state. Handheld mobile telephone 10 provides biasing current $I_1$ to thermistor 24 if it is in an operational state. Charger 12 determines whether $V_2$ received at third contact 54 is less than threshold voltage $V_t$. If the answer is yes, then logic circuit 72 closes switching device 78 so that biasing current $I_2$ of battery charger 12 is used to bias thermistor 24. Switching device 78 otherwise remains open if the answer is no. In essence, logic circuit 72 determines whether battery pack 14 is connected to an operational portable communication device so that it knows when battery charger 12 is to provide the biasing current to thermistor 24.

Once switching device 78 has been positioned properly, logic circuit 72 reads voltage $V_2$ from third contact 54 and converts it to a temperature of battery pack 14 via an analog-to-digital converter therein. Logic circuit 72 then causes switching device 78 to be placed in an open position before determining whether the converted temperature of battery pack 14 is within a designated temperature range (preferably 0°–45° C.). If the converted battery pack temperature is not within the designated temperature range, logic circuit 72 causes battery charger 12 to stop charging and returns to the beginning of the sequence via a feedback loop. Provided the converted battery pack temperature is within the designated temperature range, logic circuit 72 determines if charging of battery pack 14 is finished (in which case the voltage of battery pack 14 is maintained) or is continued. In either event, the overall process described is continued so long as battery charger 12 is connected to battery pack 14.

Having shown and described the preferred embodiment of the present invention, further adaptations of the apparatus and method for charging a battery which may be utilized to power a portable communication device can be accomplished by appropriate modifications by one of ordinary skill in the art without departing from the scope of the invention.

PARTS LIST 10 handheld mobile telephone (generally)
12 battery charger (generally)
14 battery pack (generally)
15 battery cells
16 main housing of handheld mobile telephone
18 positive terminal of battery pack
20 negative terminal of battery pack
22 third terminal of battery pack
24 thermistor
26 positive contact on battery pack first surface 32
28 negative contact on battery pack first surface 32
30 third contact on battery pack first surface 32
32 first surface of battery pack housing
34 battery pack housing
36 positive contact of handheld mobile telephone
38 negative contact of handheld mobile telephone
40 third contact of handheld mobile telephone
42 positive contact on battery pack second surface 48
44 negative contact on battery pack second surface 48
46 third contact on battery pack second surface 48
48 second surface of battery pack housing
50 positive contact of battery charger
52 negative contact of battery charger
54 third contact of battery charger
55 resettable fuse
56 logic circuit of handheld mobile telephone
58 output of logic circuit 56
60 voltage regulator of handheld mobile telephone
66 biasing resistor of handheld mobile telephone
68 node
70 input to logic circuit 56
72 logic circuit of battery charger
74 input to logic circuit 72
76 first output of logic circuit 72
78 switching device
80 second output of logic circuit 72
82 voltage regulator of battery charger
84 biasing resistor of battery charger
86 charge switch
88 AC power source
$V_1$ voltage from voltage regulator 60 of handheld mobile telephone
$V_1$ voltage from battery pack to battery charger indicative of battery temperature
$V_t$ threshold voltage
$I_1$ biasing current from handheld mobile telephone
$I_2$ biasing current from battery charger.

What is claimed is:

1. A method of charging a battery having a positive terminal, a negative terminal, and a third terminal, wherein a thermistor is positioned across said negative terminal and said third terminal, said charging method comprising the following steps:

(a) determining whether a battery is connected to a battery charger for charging;

(b) determining whether said battery is also connected to a portable communication device in an operational state;

(c) selectively biasing said thermistor by a current from one of said portable communication device and said battery charger so that a voltage is provided at said third battery terminal representative of a temperature in said battery;

(d) determining whether said battery temperature is within a designated temperature range; and (e) charging said battery with a charge current so long as said battery temperature is within said designated temperature range.

2. The battery charging method of claim 1, wherein said thermistor is biased by a current from said portable communication device.

3. The battery charging method of claim 2, wherein said portable communication device is in an operational mode.

4. The battery charging method of claim 2, a switching device being provided between a resistor in said battery charger and said third battery terminal, further comprising the step of placing said switching device in a position to prevent biasing of said thermistor by said battery charger biasing current.

5. The battery charging method of claim 1, wherein said thermistor is biased by a current from said battery charger.

6. The battery charging method of claim 5, wherein said battery is connected only to said battery charger.

7. The battery charging method of claim 5, wherein said portable communication device is in a non-operational state.

8. The battery charging method of claim 5, a switching device being provided between said resistor in said battery charger and said third battery terminal, further comprising the step of placing said switching device in a position to enable biasing of said thermistor by said battery charger biasing current.

9. The battery charging method of claim 1, said step (b) further comprising the following steps:
(a) reading said voltage received by said battery charger at said third contact; and
(b) comparing said voltage to a predetermined threshold voltage.

10. The battery charging method of claim 9, wherein said battery is connected to said portable communication device in an operational state when said voltage is greater than said threshold voltage.

11. The battery charging method of claim 9, wherein said battery is not connected to said portable communication device when said voltage is less than said threshold voltage.

12. The battery charging method of claim 9, wherein said battery is connected to said portable communication device in a non-operational state when said voltage is less than said threshold voltage.

13. The battery charging method of claim 9, further comprising the step of positioning a switching device between a resistor in said battery charger and said third battery terminal, wherein a biasing current is provided therefrom when said switching device is in a closed position.

14. The battery charging method of claim 13, further comprising the step of placing said switching device in an open position to prevent biasing of said thermistor by said battery charger biasing current when said voltage is greater than said threshold voltage.

15. The battery charging method of claim 13, further comprising the step of placing said switching device in a closed position to enable biasing of said thermistor by said battery charger biasing current when said voltage is less than said threshold voltage.

16. The battery charging method of claim 1, further comprising the step of converting said voltage at said third battery terminal into a battery temperature.

17. The battery charging method of claim 15, further comprising the step of placing said switching device in an open position after said battery temperature determining step.

18. The battery charging method of claim 1, further comprising the step of determining whether charging of said battery is completed.

19. The battery charging method of claim 1, said step (a) further comprising the step of reading a voltage across a positive contact and a negative contact of said battery charger.

20. The battery charging method of claim 1, wherein said charge current is adjusted when said battery is connected to said portable communication device in an operational state.

21. An apparatus for charging a battery having a positive terminal, a negative terminal, and a third terminal, wherein a thermistor is positioned across said negative terminal and said third terminal to provide a voltage representative of a temperature in said battery, said apparatus comprising:

(a) a positive contact positioned so as to engage said positive terminal of said battery;
(b) a negative contact positioned so as to engage said negative terminal of said battery;
(c) a third contact positioned so as to engage said third terminal of said battery;
(d) a logic circuit connected to said positive, negative, and third contacts; and
(e) a switching device receiving an input from said logic circuit which dictates whether said switching device is positioned closed so as to connect a biasing source to said third contact or positioned open;

wherein the position of said switching device is determined by said voltage received from said third battery terminal.

22. The battery charging apparatus of claim 21, wherein said switching device is maintained in said open position by said logic circuit when said battery is also connected to a portable communication device in an operational state.

23. The battery charging apparatus of claim 21, wherein said switching device is placed in said closed position by said logic circuit when said battery is connected only to said battery charging apparatus.

24. The battery charging apparatus of claim 21, wherein said switching device is placed in said closed position by said logic circuit when said battery is also connected to a portable communication device in a non-operational state.

25. The battery charging apparatus of claim 21, wherein said switching device is maintained in said open position by said logic circuit when said voltage at said third contact is greater than a threshold voltage.

26. The battery charging apparatus of claim 21, wherein said switching device is placed in said closed position by said logic circuit when said voltage at said third contact is less than a threshold voltage.

27. The battery charging apparatus of claim 21, said biasing source further comprising a pullup resistor positioned between a regulated voltage source and said switching device, wherein a current across said pullup resistor is used to bias said thermistor when said switching device is placed in said closed position by said logic circuit.

28. The battery charging apparatus of claim 21, wherein charging of said battery continues so long as said battery temperature is within a designated temperature range.

29. The battery charging apparatus of claim 21, said logic circuit further comprising an analog-to-digital converter for continuously receiving and converting said voltage from said third contact into said battery temperature.

30. A method of monitoring temperature of a battery by both a portable communication device and a battery charger connected to said battery, said battery including a positive terminal, a negative terminal, and a third terminal with a temperature sensor positioned across said negative terminal and said third terminal, comprising the following steps:

(a) determining whether said portable communication device is in an operational state;
(b) selectively biasing said temperature sensor by a current from one of said portable communication device and said battery charger;
(c) providing a voltage representative of said battery temperature from said temperature sensor to said third terminal of said battery;
(d) monitoring the voltage at said third terminal of said battery by said portable communication device; and
(e) monitoring the voltage at said third terminal of said battery by said battery charger.

* * * * *